US011592996B2

(12) United States Patent
Soukhman et al.

(10) Patent No.: US 11,592,996 B2
(45) Date of Patent: Feb. 28, 2023

(54) ONLINE ERROR RECOVERY (71) Applicant: EMC IP Holding Company LLC, Hopkinton, MA (US)

(72) Inventors: Alex Soukhman, Raanana (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/383,732

(22) Filed: Jul. 23, 2021

(65) Prior Publication Data
US 2023/0029315 A1    Jan. 26, 2023

(51) Int. Cl.
G06F 3/06 (2006.01)
G06F 11/00 (2006.01)
G06F 3/00 (2006.01)
G06F 11/07 (2006.01)
G06F 11/14 (2006.01)

(52) U.S. Cl.
CPC ............ G06F 3/0619 (2013.01); G06F 3/067 (2013.01); G06F 3/0665 (2013.01); G06F 11/0772 (2013.01); G06F 11/1435 (2013.01)

(58) Field of Classification Search
CPC ...... G06F 3/0619; G06F 3/0665; G06F 3/067; G06F 11/0772; G06F 11/1435
See application file for complete search history.

(56) References Cited

U.S. PATENT DOCUMENTS

| 9,916,191 | B1 | 3/2018 | Pan et al. | |
| 11,061,827 | B2* | 7/2021 | Shabi | G06F 12/1018 |
| 2020/0341907 | A1* | 10/2020 | Shveidel | G06F 3/0604 |
| 2020/0348998 | A1* | 11/2020 | Mathews | G06F 11/0727 |
| 2021/0133117 | A1* | 5/2021 | Shabi | G06F 12/1009 |
| 2021/0232450 | A1 | 7/2021 | Vankamamidi et al. | |
| 2021/0286766 | A1* | 9/2021 | Chen | G06F 16/1748 |

OTHER PUBLICATIONS

Vankamamidi, Vamsi, et al.; "Managing Storage Space for Metadata Consistency Checking," U.S. Appl. No. 16/819,722, filed Mar. 16, 2020.
Shabi, Uri, et al.; "Validating Storage Virtualization Metadata Supporting Redirection," U.S. Appl. No. 16/819,841, filed Mar. 16, 2020.

* cited by examiner

Primary Examiner — Justin R Knapp
(74) Attorney, Agent, or Firm — BainwoodHuang (57) ABSTRACT A technique for correcting errors in a data storage system operates while the data storage system remains online. The technique includes identifying an object for validation, scanning a plurality of pointers, and counting a number of pointers that point to the object. The technique further includes repairing a discrepancy between the count of pointers and a reference count stored in connection with the object.

20 Claims, 4 Drawing Sheets

ONLINE ERROR RECOVERY

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Data storage systems commonly use metadata to organize user data. Such metadata can sometimes develop errors. For example, any number of mapping pointers for addressing user data may point to an object, such as another mapping pointer or some other structure. The object may have an associated reference count that tracks the number of mapping pointers pointing to it. Sometimes, a hardware or software error can cause a reference count to misrepresent the correct number of pointers. When this occurs, an error or warning may be issued, alerting an administrator of a potential issue. For example, normal validation performed during read operations may detect an error and report it.

Storage systems commonly provide utilities for checking and repairing metadata, and administrators may wish to run these utilities if there is a concern. A well-known example of a utility for checking and repairing metadata is FSCK (file system check), which is available on many Linux-based systems.

SUMMARY

FSCK is a comprehensive tool for addressing metadata errors. Unfortunately, FSCK is also disruptive and resource-intensive. To run FSCK, an administrator must generally take a storage system offline, such that the storage system can no longer service requests from hosts for reads and writes. FSCK can also take considerable time to run, with runtimes often extending over several hours. Administrators alerted to errors may thus be faced with a difficult decision, whether to run FSCK and suffer the downtime or continue operating a system that has errors. The decision may be particularly difficult as the administrator may not know whether the reported errors are serious or inconsequential, or whether the errors will spread or remain localized. What is needed is a less burdensome option for addressing errors in a storage system.

To address this need at least in part, an improved technique for correcting errors in a data storage system operates while the data storage system remains online. The technique includes identifying an object for validation, scanning a plurality of pointers, and counting a number of pointers that point to the object. The technique further includes repairing a discrepancy between the count of pointers and a reference count stored in connection with the object.

Advantageously, the improved technique addresses a common type of metadata error while avoiding the need to take the data storage system offline, such that hosts can continue to access their data for reading and writing as validation and repair of errors proceeds. The technique thus promotes data availability. Also, administrators can respond to reported errors and correct them promptly, often before errors grow and become uncorrectable, thus preventing data loss.

Certain embodiments are directed to a method of correcting errors in a data storage system. The method includes identifying a DVS (data virtualization structure) for validation, the DVS pointing to a physical data element stored in the data storage system. The method further includes scanning a plurality of pointers that map logical data elements to DVSs, the scanning producing a count of pointers that point to the DVS, and repairing a discrepancy between the count of pointers and a reference count stored in association with the DVS.

In some examples, repairing the discrepancy includes updating the reference count to match the count of pointers.

In some examples, the plurality of pointers is associated with a set of volumes hosted by the data storage system, and the acts of scanning and repairing are performed while at least one of the set of volumes remains online.

In some examples, the data storage system includes leaf pointers and other pointers that point to the leaf pointers, and producing the count of pointers includes counting pointers only from among the leaf pointers.

In some examples, while scanning the plurality of pointers, the method further includes tracking changes in the plurality of pointers made during online operation of the data storage system and adjusting the count of pointers to reflect changes in pointers already counted.

In some examples, scanning the plurality of pointers includes marking pointers as processed once they have been scanned, and the method further includes receiving a request to change a pointer that points to the DVS and selectively decrementing the count for the DVS responsive to the pointer being marked as processed.

In some examples, scanning the plurality of pointers includes marking pointers as processed once they have been scanned, and the method further includes receiving a request to change a pointer that does not point to the DVS so that it does point to the DVS, and selectively incrementing the count for the DVS responsive to the pointer being marked as processed.

In some examples, the method further includes identifying a volume associated with the DVS and identifying a second DVS associated with the volume. Scanning the plurality of pointers includes producing a second count of pointers that point to the second DVS. The method still further includes correcting a discrepancy between the second count and a second reference count stored in association with the second DVS.

In some examples, identifying the volume associated with the DVS includes reading a volume identifier stored with a pointer that points to the DVS.

In some examples, the acts of scanning and correcting are performed by a software program configured to run in the data storage system in response to an administrative command.

In some examples, identifying the DVS for validation includes performing a read operation to access a set of data of a volume, the read operation checking metadata of a set of DVSs traversed while accessing the set of data, and reporting at least one of the set of DVSs as suspect based on the metadata revealing an inconsistency.

In some examples, correcting the discrepancy includes setting the reference count stored in association with the DVS to zero, and the method further includes freeing the DVS.

In some examples, the DVS provides data virtualization that enables the physical data element to be relocated without updating any of the plurality of pointers.

In some examples, the DVS is one of multiple DVSs identified for validation, scanning the plurality of pointers produces respective counts for the respective DVSs identified for validation, and, when repairing the discrepancy, discrepancies are repaired selectively for the DVSs identified for validation.

Other embodiments are directed to a computerized apparatus constructed and arranged to perform a method of correcting errors in a data storage system, such as the method described above. Still other embodiments are directed to a computer program product. The computer program product stores instructions which, when executed on control circuitry of a computerized apparatus, cause the computerized apparatus to perform a method of correcting errors, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for correcting errors in a data storage system operates while the data storage system remains online. The technique includes identifying an object for validation, scanning a plurality of pointers, and counting a number of pointers that point to the object. The technique further includes repairing a discrepancy between the count of pointers and a reference count stored in connection with the object.

Figure 1:
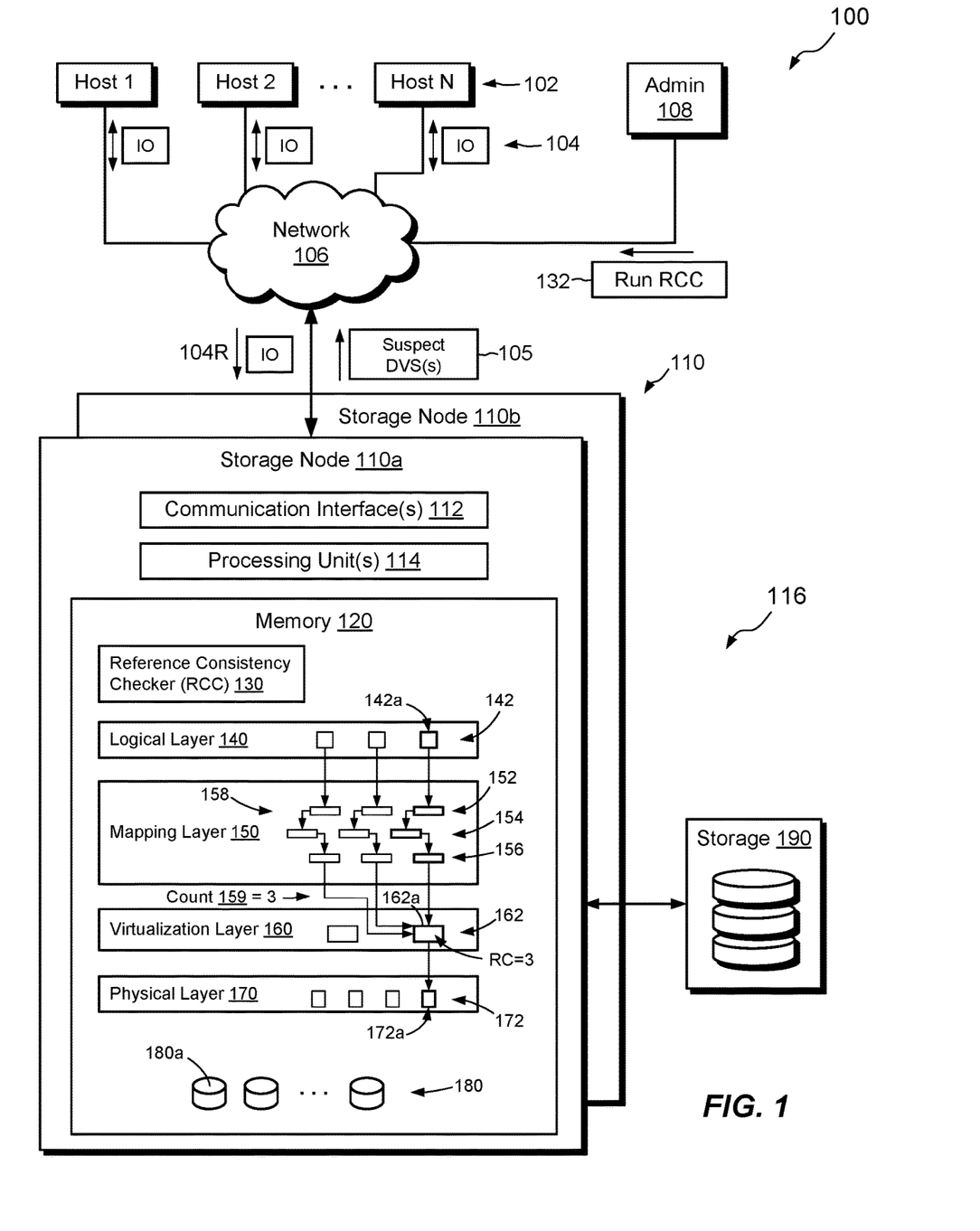
FIG. 1 is a block diagram of an example environment in which embodiments of the improved technique can be practiced.

FIG. 1 shows an example environment 100 in which embodiments of the improved technique can be practiced. Here, multiple hosts 102 access a data storage system 116 over a network 106. The data storage system 116 includes multiple storage nodes 110, such as a first node 110a and a second node 110b, as well as storage 190, such as magnetic disk drives, electronic flash drives, and/or the like. Storage nodes 110 may be provided as circuit board assemblies, such as blades, which plug into a chassis that encloses and cools the storage nodes. The chassis may have a backplane or midplane for interconnecting the storage nodes, and additional connections may be made among storage nodes using cables. In some examples, the data storage system 116 is provided as a storage cluster or appliance, which includes two nodes 110 that share the storage 190. In some arrangements, one or more host applications run directly on the storage nodes 110, such that separate host machines 102 need not be present. No particular hardware configuration is required, however, as storage nodes 110 may be provided in any arrangement and each node 110 may be any type of computing device capable of running software and processing host 110's (input/output requests).

The network 106 may be any type of network or combination of networks, such as a storage area network (SAN), a local area network (LAN), a wide area network (WAN), the Internet, and/or some other type of network or combination of networks, for example. In cases where hosts 102 are provided, such hosts 102 may connect to the nodes 110 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The nodes 110 are configured to receive I/O requests 104 according to block-based and/or file-based protocols and to respond to such I/O requests 104 by reading or writing the storage 190.

Storage nodes 110 may be similarly configured, although they need not be identical. In an example, each storage node 110 includes one or more communication interfaces 112, a set of processing units 114, and memory 120. The communication interfaces 112 include, for example, SCSI target adapters and/or network interface adapters for converting electronic and/or optical signals received over the network 106 to electronic form for use by the respective storage node 110. The set of processing units 114 includes one or more processing chips and/or assemblies, such as numerous multi-core CPUs (central processing units). The memory 120 may include both volatile memory, e.g., RAM (Random Access Memory), and non-volatile memory, such as one or more ROMs (Read-Only Memories), disk drives, solid state drives, and the like. The set of processing units 114 and the memory 120 together form control circuitry, which is constructed and arranged to carry out various methods and functions as described herein. Also, the memory 120 includes a variety of software constructs realized in the form of executable instructions. When the executable instructions are run by the set of processing units 114, the set of processing units 114 carries out the operations of the software constructs. Although certain software constructs are specifically shown and described, it is understood that the memory 120 typically includes many other software components, which are not shown, such as an operating system, various applications, processes, and daemons.

As further shown in FIG. 1, the memory 120 "includes," i.e., realizes by execution of software instructions, a reference consistency checker (RCC) 130 and various structures that constitute an access path for data. The access path may include, for example, a logical layer 140, a mapping layer 150, a virtualization layer 160, and a physical layer 170.

The logical layer 140 is configured to organize logical data into a logical address space. The logical data may include volumes, file systems, virtual machine disks, snapshots, and/or the like. Example volumes 180 are depicted at the bottom of FIG. 1. The logical address space may be denominated in logical data elements 142, such as logical blocks, for example, where each block may be the smallest allocation unit of logical data (blocks may also be referred to herein as "pages"). Logical data elements 142 may be uniform in size, with common sizes being 4 kB or 8 kB, for example.

The mapping layer 150 is configured to map logical data elements 142 in the logical layer 140 to corresponding virtual data elements 162 in the virtual layer 160. For example, the mapping layer 150 maps logical block 142a to virtual data element 162a. In an example, the mapping layer 152 includes multiple levels of pointers 158. Three levels are shown, a top level 152, a middle level 154, and a bottom or "leaf" level 156. Different numbers of levels may be provided in different implementations. The pointers in the leaf level 156 point to virtual data elements 162 in the virtualization layer 160.

Pointers 158 at each of the levels 152, 154, and 156 may be organized into arrays (not shown in FIG. 1). Such arrays may contain multiple pointers each, such as 512 or 1024 pointers, for example. The arrays may be arranged into tree structures, with a pointer in an array at the top level 152 pointing to a mid-level array, and with a pointer in the middle level pointing to a leaf-level array. The effect of the tree structure is to provide mapping for large amounts of data. Assuming 4-kB blocks and 512 pointers per array, a single leaf array in layer 156 can map 2 MB of data, a single array in the middle level 154 can map 1 GB of data, and a single array in the top level 152 can map 512 GB of data.

The virtual layer 160 is configured to provide virtual data elements 162, also referred to herein as data virtualization structures, or "DVSs." DVSs 162 enable data virtualization by allowing data to be moved among different locations in the physical layer 170 without having to update any leaf pointers in the mapping layer 150. Rather, updates to accommodate movement of physical data may be achieved by changing pointers in DVSs 162.

The physical layer 170 is configured to provide physical data elements 172. Such physical data elements 172 correspond to data stored on disk, e.g., in storage 190. Typically, physical data elements 172 refer to compressed data, but data may alternatively be uncompressed. As shown, DVS 162a points to physical data element 172a.

Data access typically proceeds from top to bottom. For example, to read the data of logical data element 142a, the data storage system 116 accesses a pointed-to array in the top layer 152, follows a pointer in that array to an array in the middle layer 154, follows a pointer in that mid-level array to an array in the leaf level 156, and follows a leaf pointer in the leaf-level array to a DVS in the virtualization layer 160, i.e., to DVS 162a. The specific pointer followed in each array may be determined based on logical address.

Although there is generally a one-to-one correspondence between DVSs 162 and physical data elements 172, there may be a many-to-one correspondence between leaf pointers 156 and DVSs 162. For example, multiple leaf pointers may be provided for mapping respective logical data elements 142. A deduplication facility (not shown) may detect matching data pointed to by these leaf pointers and adjust the leaf pointers so that they all point to the same DVS, i.e., to the DVS that points to a single copy of the matching data. In the example shown, three different leaf pointers 156 corresponding to three respective logical data elements 142 are seen to point to DVS 162a, rather than to respective DVSs, as all three logical data elements refer to identical data, which is stored in physical data 172a.

In an example, DVSs 162 are resources that may be allocated when needed and freed when not needed. For instance, a DVS 162 may be freed when no leaf pointers 156 point to that DVS. Thus, it is useful to maintain a reference count 330 (FIG. 3) for tracking how many pointers 156 point to each DVS. Storage processes may increment the reference count 330 for a DVS each time an additional leaf pointer 156 is pointed to the DVS and may decrement the reference count 330 each time a leaf pointer 156 pointing to the DVS is pointed away. When the reference count 330 reaches zero, the DVS may be freed, so that it can be made available for use at a later time.

In example operation, the data storage system 116 receives I/O requests 104 from hosts 102 and responds by reading and writing data. As the data storage system 116 processes many I/O requests 104, new allocations, overwrites, deduplications, and deletions may occur, which may cause reference counts 330 on DVSs 162 to increase and decrease, i.e., to reflect the proper counts of pointers 156 pointing to the DVSs.

Sometimes, an error may cause a storage system to update reference counts 330 improperly or to overwrite reference counts inadvertently. Administrators can discover some of these errors during normal system usage. For example, a read operation 104R may cause the data storage system 116 to access certain pointers 158 and VBSs 162. The data storage system may perform simple validation when performing the read, such as checksum validation and basic reference-count checking. If the read operation 104R checks the reference count 330 of a DVS 162 and finds it to be zero, even though the DVS is used for accessing currently-requested data, an error is indicated, as the reference count 330 should be no less than one. This is merely one example of how a reference-count error can be detected.

In the case where a read request detects a reference count error, the data storage system may provide a message 105 to the administrator indicating the error. The administrator may then decide how to respond. Previously, the administrator's options where to shut down the storage system and run FSCK or to continue operating the storage system and hope for the best.

In accordance with improvements hereof, the administrator has an additional option, that of running the reference consistency checker (RCC) 130 while the data storage system remains online. Here, we assume that the administrator issues an instruction 132 to run the RCC 130, which then proceeds as follows.

In an example, the RCC 130 begins by identifying one or more DVSs 162 that the administrator suspects of being corrupted. Such DVSs may be provided in a list of suspect DVSs, for example. Suspect DVSs may be specifically identified, e.g., in one or more responses 105 to read requests, and/or they may be assumed to be suspect by the administrator. For example, the administrator may enlarge the scope of suspects to include all DVSs supporting a particular volume 180, or to include some number of DVSs stored adjacent to specifically identified suspect DVSs. If the administrator suspects an entire volume 180 of being potentially corrupted, the administrator may direct the data storage system 116 to read all of the data of that volume, such that erroneous DVSs can be identified in one or more messages 105. Indeed, the administrator may direct the data storage system to read any and all volumes 180 hosted by the data storage system 116 if a wide scope of errors is suspected. Any suspect DVSs reported by messages 105 (and/or added by the administrator) may then be included on the list of identified DVSs.

In an example, the RCC 130 scans the mapping layer 150 for any pointers that point to the listed DVSs and maintains a respective count 159 for each of them. For example, the RCC 130 maintains one count 159 for DVS 162a and an additional count 159 for each of the other listed suspect DVSs. In general, only leaf pointers 156 are counted during the scanning as only leaf pointers point directly to DVSs. At the conclusion of the scan, the RCC 130 provides a respective count 159 for each of the listed DVSs. Ideally, the count 159 for each DVS matches the reference count 330 stored in connection with the respective DVS. If the count 159 and the reference count for a DVS match, no correction is required. If they do not match, however, the RCC 130 may replace the reference count 330 with the determined count 159 that results from scanning. For example, if the reference count 330 for DVS 162a was two and the scanning found the correct count to be three, then the RCC 130 would replace the two with the three. As another example, if the reference count for a DVS was one and the scanning found the correct count 159 to be zero, the RCC 130 would change the reference count 330 to zero and direct the storage system to free the DVS.

At the conclusion of operation of the RCC 130, reference counts of DVSs reflect actual counts 159 of pointers that point to the respective DVSs. The administrator can then proceed with confidence that the data storage system 116 is healthy. As the RCC 130 runs nondisruptively and does not require that the storage system or any of its volumes be taken offline, the administrator's confidence can be restored at very low cost, as running the RCC 130 has little to no impact on performance.

Figure 2:
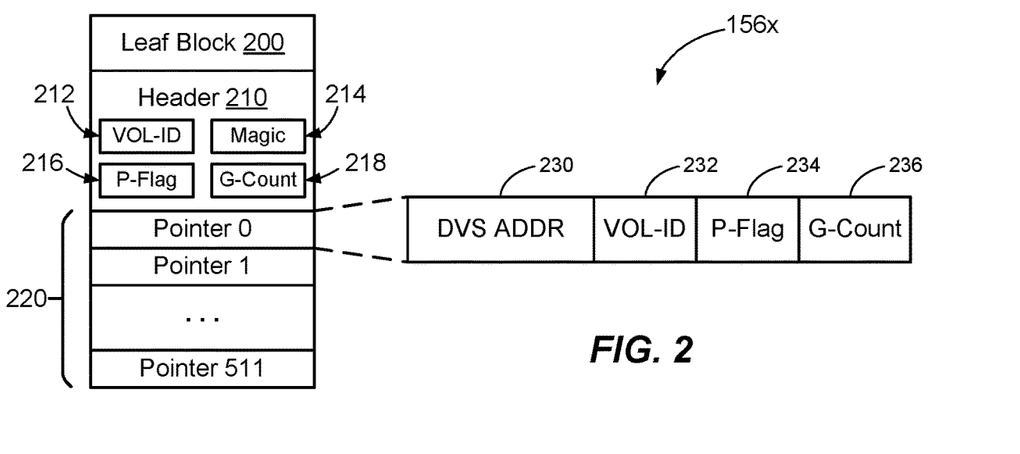
FIG. 2 is a block diagram of an example array of pointers, which may be used in the environment of FIG. 1.

FIG. 2 shows an example array of leaf pointers in leaf level 156. Here, the array is arranged in a leaf block 200 that contains 512 leaf pointers. Other embodiments may include a greater or lesser number of leaf pointers. The leaf block 200 is seen to include a header 210 and pointers 220. In the example shown, the header 210 includes a volume identifier 212, a "magic" number 214, a processed flag (P-Flag) 216, and a generation count 218. In an example, the volume identifier 212 specifies a volume 180 for which the leaf block 200 was originally allocated. The "magic number" 214 identifies the block 200 as a leaf block (rather than some other type of block, such as a top block or a middle block). The P-Flag 216 indicates whether the leaf block 200 has been counted during a current run of the RCC 130, and the generation count 218 indicates a most recent running of the RCC 130 that scanned the leaf block 200. The generation count 218 can thus be used to determine whether the leaf block 200 was last scanned by the RCC in a current run or during a previous run.

For example, the generation count 218 is set to a current value when the RCC 130 first starts. The P-Flag 216 is then set when the pointers 220 in the leaf block 200 have all been counted. As will be described more fully below, the P-Flag 216 may be used to alert other processes in the data storage system 116 of the fact that the RCC 130 has already counted pointers 220 in the leaf block 200. The "other processes" may include those which normally change pointers 220. If those processes change a pointer 220 that the RCC 130 has already counted for a particular DVS 162 and the P-Flag 216 is set (with the current generation count), those processes may alert the RCC 130 so that the count being accumulated for that DVS may be adjusted. For example, if the other process changes one of the pointers 220 which previously pointed to $DVS_A$ so that it points to $DVS_B$, the process may check the P-Flag 216 and, if it is set with the current generation count, alert the RCC 130 that the count for $DVS_A$ should be decremented by one. If the P-Flag 216 is not set, then no change in the accumulated count for $DVS_A$ is required.

As shown in the example to the right of FIG. 2, a leaf pointer 156x (one of pointers 220) includes a DVS address 230, a volume identifier 232, a P-Flag 234, and a generation count 236. The leaf pointer 156x is intended to be representative of the leaf pointers 220, which correspond to the leaf pointers in level 156 of the mapping layer 150. Here, DVS address 230 identifies a particular DVS 162 in the virtualization layer 160 and provides a pointer to that DVS. The volume identifier 232, P-Flag 234, and generation count 218 provide the same information as the respective elements 212, 216, and 218, but they are provided at pointer-level granularity rather than at block-level granularity. One should appreciate that some embodiments may include these elements at the leaf-block level only whereas others may include it at the individual pointer level only. Some may include the volume identifier and P-Flag at both levels. In a preferred embodiment, the volume ID, P-Flag, and G-Count are provided at the leaf-block level only. This is just an example, however. In addition, the G-Count may be provided as an incrementing count (e.g., which increases by one each time the RCC 130 is run), but this is not required. Alternatively, the G-Count may be provided as some other value or identifier capable of distinguishing a current run of the RCC 130 from previous runs. Further, one should appreciate that the contents shown in the header 210 may alternatively be provided in a footer or in some other metadata that accompanies the leaf block 200. The example shown is merely illustrative.

Figure 3:
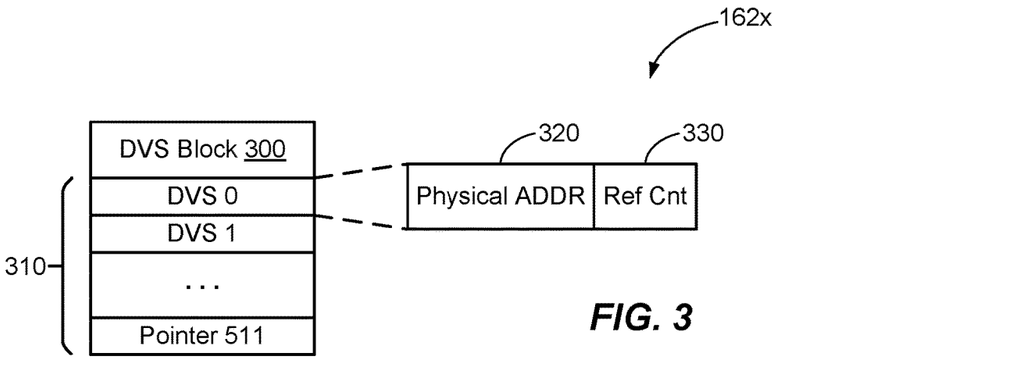
FIG. 3 is a block diagram of an example array of data virtualization structures, which may be used in the environment of FIG. 1.

FIG. 3 shows an example DVS block 300. Like leaf pointers, DVSs may also be arranged in blocks. In the example shown, a DVS block 300 includes an array 310 of DVSs. A typical DVS 162x is shown to the right, with DVS 162x intended to be representative of the DVSs 162 of FIG. 1. As shown, DVS 162x includes a physical address 320 and a reference count 330. The physical address 320 is a pointer to a physical data element 172 (such as 172a). The reference count 330 provides a current count of all leaf pointers that point to DVS 162x. Although the reference count 330 is shown as being part of the DVS 162x, it may alternatively be located in some other structure associated with the DVS 162x, such as in some other metadata structure.

Figure 4:
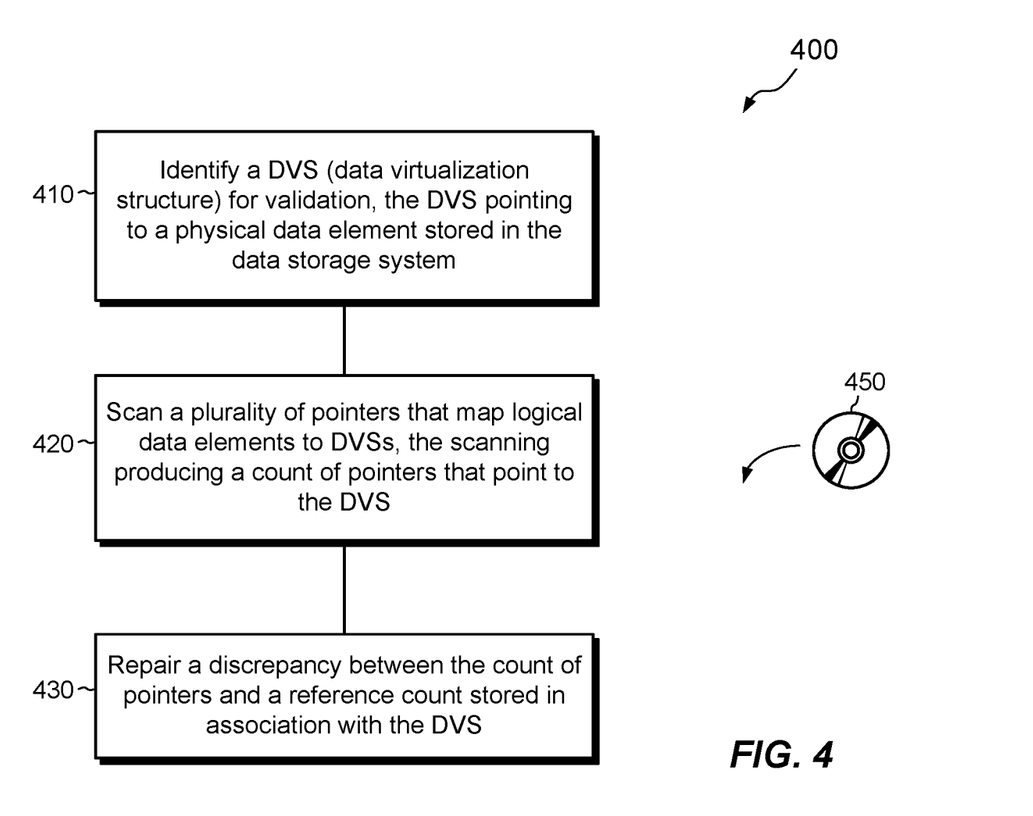
FIG. 4 is a flowchart showing an example method of correcting errors in a data storage system.
Figure 5:
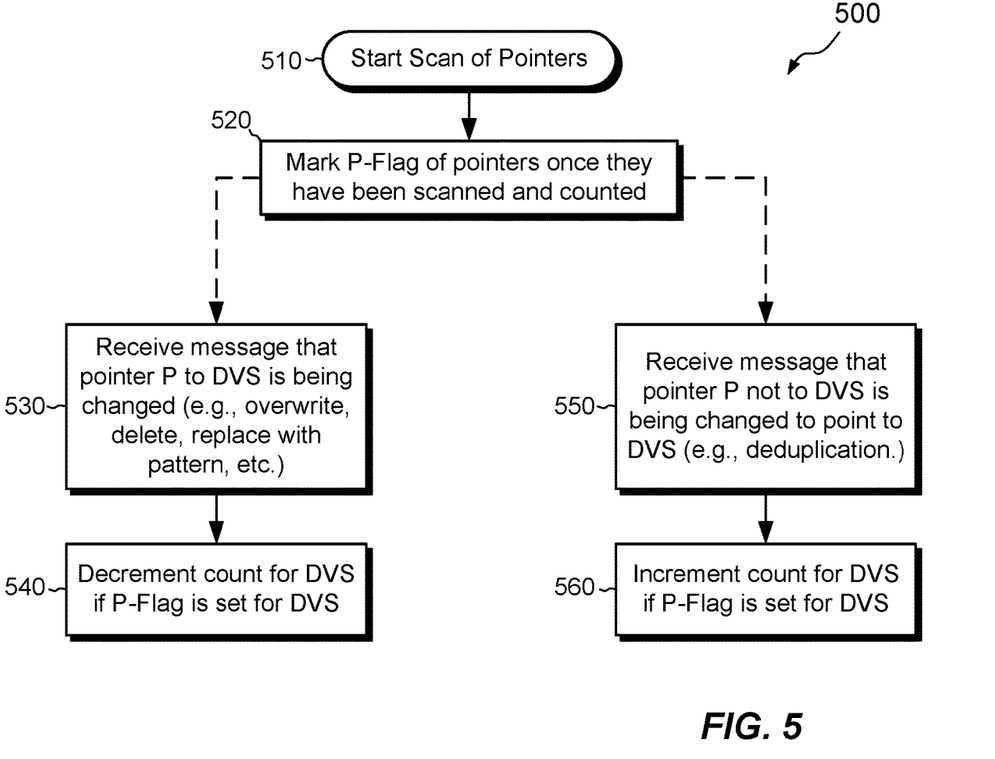
FIG. 5 is a flowchart showing an example method of adjusting for changes in a count of pointers resulting from continued activities of the data storage system as it remains online and processes reads and/or writes.
Figure 6:
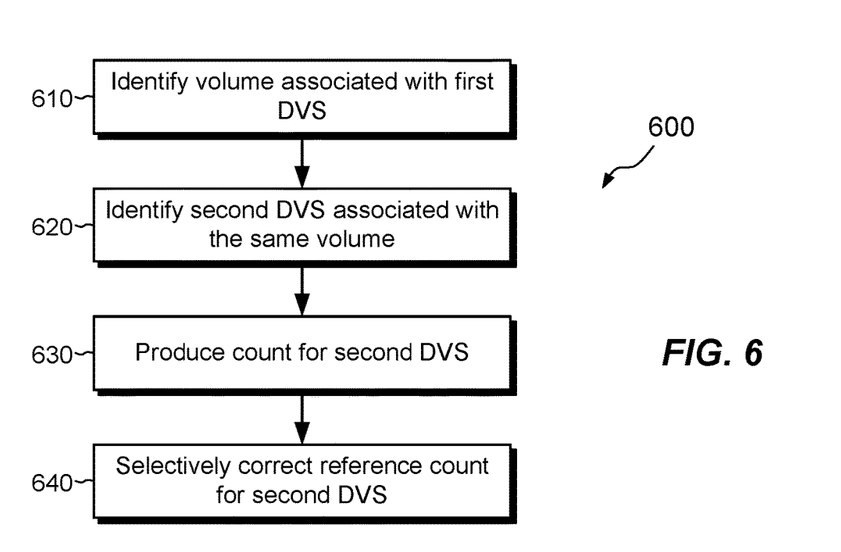
FIG. 6 is a flowchart showing an example method of validating a second DVS that maps data of the same volume as a first DVS.

FIGS. 4-6 show example methods that may be carried out in connection with the environment 100. These methods are typically performed, for example, by the software constructs described in connection with FIG. 1, which reside in the memory 120 of a storage node 110 (e.g., 110a or 110b) and are run by the respective set of processing units 114. The various acts of the depicted methods may be ordered in any suitable way. Accordingly, embodiments may be constructed in which acts are performed in orders different from those illustrated, which may include performing some acts simultaneously.

FIG. 4 shows an example method 400 of correcting errors in a data storage system. The method 400 may be carried out, for example, by the RCC 130 of the data storage system 116 as shown in FIG. 1. Although the method 400 describes operation for only a single DVS, one should appreciate that the method 400 may be run with any number of DVSs, such as with a list of suspect DVSs.

At 410, a DVS (data virtualization structure) 162 is identified for validation. The DVS 162 points to a physical data element 172 stored in the data storage system 116. The DVS 162 may be one of multiple DVSs identified for validation, such as a list 105 of suspect DVSs.

At 420, the RCC 130 scans a plurality of pointers 158 that map logical data elements 142 to the DVS 162. The scanning produces a count 159 of pointers that point to the identified DVS. In cases where multiple suspect DVSs are identified, the scanning may produce a respective count 159 for each of the suspect DVSs. For example, an array (not shown) may be provided for holding counts 159 of pointers for respective DVSs. In some examples, the scanning is limited to pointers at the leaf level 156. For instance, only leaf blocks 200 are checked for pointers to the suspect DVS(s). Blocks containing pointers at other levels are not checked, reflecting the fact that only leaf pointers point directly to DVSs.

At 430, the RCC 130 repairs a discrepancy between the count 159 of pointers and a reference count 330 stored in association with the DVS 162, e.g., in response to detecting that the count 159 and reference count 330 do not agree. Where a list 105 of suspect DVSs is provided, the RCC 130 may selectively repair discrepancies in the respective reference counts 330 of the suspect DVSs. For example, in cases in which the accumulated count 159 of pointers does not match the respective reference count 330, the reference count 330 may be replaced with the count 159. In cases in which the accumulated count 159 matches the respective reference count 330, no action may be performed as the reference count 330 is already proper.

It can thus be seen that the method 400 provides a lightweight and non-disruptive technique for validating reference counts of suspect DVSs and for correcting discrepancies when they are found. The technique can be operated without the need to take the data storage system 116 offline and without the need to take any volumes 180 offline. Rather, the data storage system 116 can continue to operate as usual. Thus, many concerns that the administrator may have about the health of the data storage system can be addressed simply and at very low cost.

One should appreciate that the RCC 130 may be provided in any suitable manner. For example, the RCC 130 may be a standalone tool or utility, which the administrator can run specifically to address the discovery of suspect DVSs. Alternatively, the RCC 130 may be part of some other tool, utility, or program. For example, a data storage system 116 may contain some other program that already performs scanning of pointers 158, and the RCC 130 may be implemented as a feature of that pre-existing program. The example as shown should thus be regarded as illustrative rather than limiting.

Additional functionality may be provided to help ensure that the RCC 130 can operate nondisruptively. Such functionality adjusts counts 159 to reflect on-the-fly changes made in the mapping layer 150 by other software processes. For example, if the RCC 130 has already counted a particular leaf pointer 156 that points to a DVS, and the leaf pointer 156 is then changed to point elsewhere before the RCC 130 completes, the accumulated count 159 for the DVS may not reflect a true count, potentially causing the RCC 130 to adjust the respective reference count 330 improperly. Accordingly, measures may be taken to adjust counts 159 based on activities that take place while the RCC 130 is running.

FIG. 5 shows an example method 500 of adjusting for changes in one or more counts 159 of pointers resulting from continuing activities of the data storage system 116 as it remains online. As used herein, the term "online" means that the data storage system is functional and able to respond to I/O requests 104 from hosts 102 for performing reading and writing. The term applies to the data storage system 116 as well as to its volumes 180, which may be considered online when they are able to respond to reads and writes and offline when they are not.

At 510, the RCC 130 receives a list of one or more suspect DVSs. The RCC starts scanning pointers 158 in the mapping layer 150, i.e., to identify and count pointers that point to the suspect DVSs.

At 520, the RCC 130 marks the P-flag of pointers once they have been scanned and counted. This act may involve marking the P-Flag 216 of entire leaf blocks 200 once all of their pointers 220 have been scanned and counted, and/or it may involve marking the P-flag 234 of individual leaf pointers 156x once those individual leaf pointers have been scanned and counted. At this point the generation count 218 and/or 236 may also be updated to reflect the current running of the RCC 130. Once the P-flag (for a block or individual pointer) has been marked with the current generation count, other processes that participate in changing leaf pointers can check the P-Flag and alert the RCC 130 if any counted pointers are being changed.

For example, at 530 the RCC 130 receives a message that a pointer to a DVS is being changed. For instance, a particular logical data element 142 may be being overwritten, deleted, or replaced with a pattern, such that the associated leaf pointer 156x is being changed and no longer points to the same DVS (or necessarily to any DVS).

At 540, the RCC 130 checks whether the P-Flag for the changing leaf pointer 156x is marked with the current generation count. If so, the RCC 130 decrements the accumulated count 159 for the associated DVS (i.e., the DVS pointed to by the changing leaf pointer), so that the count 159 properly reflects the number of pointers to that DVS. If the P-Flag is not set, then no action is required, as the RCC 130 has not yet checked the leaf pointer 156x so no adjustment is needed.

Acts 530 and 540 cover the case where a pointer to a suspect DVS is being changed while the RCC is running. In contrast, acts 550 and 560 cover the case where a pointer to a DVS that is not identified as suspect is being changed to a DVS that is identified as suspect.

For example, at 550 the RCC 130 receives a message indicating that a pointer to some other DVS (not marked as suspect) is being changed to a DVS that is marked as suspect. This may occur, for example, when the data storage system 116 is running deduplication and the pointer to the other DVS is being changed so that it points instead to the suspect DVS. In this case, the count for the suspect DVS should be increased by one.

At 560, the RCC 130 checks the P-Flag and generation count (block or individual) for the suspect DVS and increments its associated count 159 if the P-flag is set for the current generation count. Again, no action is required if the P-Flag is not set for the current generation count.

One should appreciate that the acts 520-560 may be performed any number of times during operation of the RCC 130. In the manner described, the RCC 130 continues to produce accurate counts 159, even when the data storage system is dynamically changing.

FIG. 6 shows an example method 600 of validating a second DVS that maps data of the same volume as a first DVS. Method 600 may be used, for example, in cases where the administrator receives a message indicating that a first DVS is suspect and wishes to extend validation to a second DVS that points to data of the same volume.

At 610, the data storage system 116 identifies a volume 180 associated with the first DVS. The data storage system 116 may identify the volume 180 on a list 105 of suspect DVSs, based for example on an I/O request 104 to read the volume 180, and/or based on reading the volume identifier 212 and/or 232 in a leaf pointer that points to a suspect DVS.

At 620, the data storage system 116 identifies a second DVS associated with the same volume 180. For example, the RCC 130 may check the volume identifier 212 and/or 232 of leaf pointers (or leaf blocks) as it performs the scan of pointers. The RCC 130 may then check the associated DVSs, for example, by checking the DVS addresses 230 of the leaf pointers 156 and noting another leaf pointer that points to the first DVS.

At 630 the RCC produces a count 159 for the second DVS, and at 640 the RCC 130 selectively corrects the reference count 330 for the second DVS, e.g., by setting the reference count 330 to the accumulated count 159.

The above-described acts thus have the effect of making the second DVS a suspect DVS by virtue of its association with the same volume as the first DVS, such that the second DVS is checked and corrected, if necessary, as is the first. One should appreciate that any number of other DVSs associated with the same volume may be included in the list 105 of suspect DVSs and may be checked and corrected in a similar manner.

An improved technique has been described for correcting errors in a data storage system 116 while the data storage system remains online. The technique includes identifying a DVS 162 for validation, scanning a plurality of pointers 158, and counting a number of pointers 158 that point to the DVS 162. The technique further includes repairing a discrepancy between a count 159 of pointers and a reference count 330 stored in connection with the DVS 162.

Having described certain embodiments, numerous alternative embodiments or variations can be made. For example, although embodiments have focused on validating reference counts of DVSs 162, other embodiments may focus on validating other reference counts of other objects, such as pointers 158 in the mapping layer 150

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of correcting discrepancies in a data storage system, comprising:
    identifying a DVS (data virtualization structure) for validation, the DVS pointing to a physical data element stored in the data storage system;
    scanning a plurality of pointers that map logical data elements to DVSs, the scanning producing a count of pointers that point to the DVS; and
    repairing a discrepancy between the count of pointers and a reference count stored in association with the DVS.

2. The method of claim 1, wherein repairing the discrepancy includes updating the reference count to match the count of pointers.

3. The method of claim 1, wherein the plurality of pointers is associated with a set of volumes hosted by the data storage system, and wherein said scanning and repairing are performed while at least one of the set of volumes remains online.

4. The method of claim 1, wherein the plurality of pointers includes leaf pointers, wherein the data storage system further includes other pointers that point to the leaf pointers, and wherein producing the count of pointers includes counting pointers only from among the leaf pointers.

5. The method of claim 1, further comprising, while scanning the plurality of pointers, tracking changes in the plurality of pointers made during online operation of the data storage system and adjusting the count of pointers to reflect changes in pointers already counted.

6. The method of claim 1, wherein scanning the plurality of pointers includes marking pointers as processed once they have been scanned, and wherein the method further comprises:
   receiving a request to change a pointer that points to the DVS; and
   selectively decrementing the count of pointers for the DVS responsive to the pointer being marked as processed.

7. The method of claim 1, wherein scanning the plurality of pointers includes marking pointers as processed once they have been scanned, and wherein the method further comprises:
   receiving a request to change a pointer that does not point to the DVS so that it does point to the DVS; and
   selectively incrementing the count of pointers for the DVS responsive to the pointer being marked as processed.

8. The method of claim 1, further comprising (i) identifying a volume associated with the DVS and (i) identifying a second DVS associated with the volume,
   wherein scanning the plurality of pointers includes producing a second count of pointers that point to the second DVS, and
   wherein the method further comprises correcting a discrepancy between the second count and a second reference count stored in association with the second DVS.

9. The method of claim 8, wherein identifying the volume associated with the DVS includes reading a volume identifier stored with a pointer that points to the DVS.

10. The method of claim 1, wherein said scanning and correcting are performed by a software program configured to run in the data storage system in response to an administrative command.

11. The method of claim 1, wherein identifying the DVS for validation includes:
   performing a read operation to access a set of data of a volume, the read operation checking metadata of a set of DVSs traversed while accessing the set of data; and
   reporting at least one of the set of DVSs as suspect based on the metadata revealing an inconsistency.

12. The method of claim 1, wherein correcting the discrepancy includes setting the reference count stored in association with the DVS to zero, and wherein the method further comprises freeing the DVS.

13. The method of claim 1, wherein the DVS provides data virtualization that enables the physical data element to be relocated without updating any of the plurality of pointers.

14. The method of claim 1, wherein the DVS is one of multiple DVSs identified for validation, wherein scanning the plurality of pointers produces respective counts for the respective DVSs identified for validation, and wherein, when repairing the discrepancy, discrepancies are repaired selectively for the DVSs identified for validation.

15. A computerized apparatus, comprising control circuitry that includes a set of processing units coupled to memory, the control circuitry constructed and arranged to:
   identify a DVS (data virtualization structure) for validation, the DVS pointing to a physical data element stored in the computerized apparatus;
   scan a plurality of pointers that map logical data elements to DVSs, the scanning producing a count of pointers that point to the DVS; and
   repair a discrepancy between the count of pointers and a reference count stored in association with the DVS.

16. A computer program product including a set of non-transitory, computer-readable media having instructions which, when executed by control circuitry of a computerized apparatus, cause the computerized apparatus to perform a method of correcting discrepancies, the method comprising:
   identifying a DVS (data virtualization structure) for validation, the DVS pointing to a physical data element stored in the computerized apparatus;
   scanning a plurality of pointers that map logical data elements to DVSs, the scanning producing a count of pointers that point to the DVS; and
   repairing a discrepancy between the count of pointers and a reference count stored in association with the DVS.

17. The computer program product of claim 16, wherein identifying the DVS for validation includes:
   performing a read operation to access a set of data of a volume, the read operation checking metadata of a set of DVSs traversed while accessing the set of data; and
   reporting at least one of the set of DVSs as suspect based on the metadata revealing an inconsistency.

18. The computer program product of claim 16, further comprising, while scanning the plurality of pointers, tracking changes in the plurality of pointers made during online operation of the data storage system and adjusting the count of pointers to reflect changes in pointers already counted.

19. The computer program product of claim 16, wherein scanning the plurality of pointers includes marking pointers as processed once they have been scanned, and wherein the method further comprises:
   receiving a request to change a pointer that points to the DVS; and
   selectively decrementing the count of pointers for the DVS responsive to the pointer being marked as processed.

20. The computer program product of claim 16, wherein scanning the plurality of pointers includes marking pointers as processed once they have been scanned, and wherein the method further comprises:
   receiving a request to change a pointer that does not point to the DVS so that it does point to the DVS; and
   selectively incrementing the count of pointers for the DVS responsive to the pointer being marked as processed.

\* \* \* \* \*